(12) United States Patent
Kim et al.

(10) Patent No.: US 11,595,091 B2
(45) Date of Patent: Feb. 28, 2023

(54) METHOD OF TRANSMITTING SOUNDING REFERENCE SIGNAL AND ELECTRONIC DEVICE THEREFOR

(71) Applicant: Samsung Electronics Co., Ltd., Suwon-si (KR)

(72) Inventors: Woojin Kim, Suwon-si (KR); Kihyug Seong, Suwon-si (KR); Dongil Yang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/556,143

(22) Filed: Dec. 20, 2021

(65) Prior Publication Data

US 2022/0116085 A1    Apr. 14, 2022

Related U.S. Application Data

(63) Continuation of application No. 16/839,529, filed on Apr. 3, 2020, now Pat. No. 11,206,066.

(30) Foreign Application Priority Data

Apr. 3, 2019  (KR) .................. 10-2019-0038991

(51) Int. Cl.
*H04B 7/0413* (2017.01)
*H04B 7/06* (2006.01)
(Continued)

(52) U.S. Cl.
CPC ......... *H04B 7/0608* (2013.01); *H04B 7/0413* (2013.01); *H04B 17/318* (2015.01); *H04L 5/0048* (2013.01); *H04W 72/04* (2013.01)

(58) Field of Classification Search
CPC .. H04B 17/318; H04B 7/0413; H04B 7/0608; H04L 5/0048; H04W 72/04
See application file for complete search history.

(56) References Cited

U.S. PATENT DOCUMENTS

2009/0278742 A1   11/2009   Mehta et al.
2013/0267181 A1   10/2013   Ayatollahi et al.
(Continued)

FOREIGN PATENT DOCUMENTS

CN      106549695 A      3/2017
JP      H10-107744 A     4/1998
(Continued)

OTHER PUBLICATIONS

Ericsson, "Antenna Selection UL Transmission", 3GPP Draft, R1-1720971, UL 1 TX Selection, 3rd Generation Partnership Project (3GPP), vol. RAN WG1, Reno, USA, Nov. 27, 2017-Dec. 1, 2017, Nov. 18, 2017, XP051370337.
(Continued)

*Primary Examiner* — Rahel Guarino
(74) *Attorney, Agent, or Firm* — Jefferson IP Law, LLP

(57) ABSTRACT

A transmission of a sounding reference signal by an electronic device is provided. A method of an electronic device includes transmitting a signal via a first antenna subset including at least one of a plurality of antennas, measuring an emission environment of the plurality of antennas, using the signal, determining at least one antenna to be used for transmitting a sounding reference signal (SRS), based on the emission environment, and transmitting the SRS via the at least one determined antenna. The emission environment includes a strength of a reflected signal that corresponds to the signal and is reflected by the first antenna subset, or a strength of a reception signal that corresponds to the signal and is received by a second antenna subset including at least one remaining antenna.

18 Claims, 14 Drawing Sheets

(51) Int. Cl.
*H04L 5/00* (2006.01)
*H04B 17/318* (2015.01)
*H04W 72/04* (2023.01)

(56) References Cited

U.S. PATENT DOCUMENTS

| | | | |
|---|---|---|---|
| 2016/0099800 A1* | 4/2016 | Park | H04B 1/44 370/275 |
| 2017/0180024 A1 | 6/2017 | Kurth et al. | |
| 2019/0288714 A1 | 9/2019 | Bai | |

FOREIGN PATENT DOCUMENTS

| | | |
|---|---|---|
| JP | 2003-318844 A | 11/2003 |
| KR | 10-2005-0107916 A | 11/2005 |
| WO | 2014/065850 A1 | 5/2014 |
| WO | 2017/081522 A1 | 5/2017 |
| WO | 2017/192889 A1 | 11/2017 |
| WO | 2019/022329 A1 | 1/2019 |
| WO | 2019/043436 A1 | 3/2019 |

OTHER PUBLICATIONS

Extended European Search Report dated Feb. 18, 2022, issued in European Patent Application No. 20781787.5—1205.
3rd Generation Partnership Project; Technical Specification Group Radio Access Network; NR; Physical layer procedures for data (Release 15), 3GPP TS 38.214 V15.4.0, Dec. 2018, Valbonne, France.
International Search Report dated Jul. 22, 2020, issued in International Application No. PCT/KR2020/004579.
Vivo, "Discussion on Codebook Based UL Transmission", 3GPP Draft, R1-1717467, 3GPP TSG RAN WG1 Meeting #90bis, Prague, CZ, Oct. 9, 2017-Oct. 13, 2017, Oct. 8, 2017, XP051340655.
European Office Action dated Oct. 28, 2022, issued in European Patent Application No. 20781787.5-1206.

\* cited by examiner

METHOD OF TRANSMITTING SOUNDING REFERENCE SIGNAL AND ELECTRONIC DEVICE THEREFOR

CROSS-REFERENCE TO RELATED APPLICATION(S)

This application is a continuation application of prior application Ser. No. 16/839,529, filed on Apr. 3, 2020, which is based on and claims priority under 35 U.S.C. § 119(a) of a Korean patent application number 10-2019-0038991, filed on Apr. 3, 2019, in the Korean Intellectual Property Office, the disclosure of which is incorporated by reference herein in its entirety.

BACKGROUND

1 Field

The disclosure relates to a method for transmitting a sounding reference signal (SRS) and an electronic device therefor.

2 Description of Related Art

A cellular wireless communication system may be designed to achieve a high throughput. The throughput may be increased by various ways, such as extending a bandwidth, increasing a modulation order, adapting multiple input multiple output (MIMO) technology, or the like. Among them, MIMO technology is a technology that increases a channel capacity using a plurality of transmission antennas and a plurality of reception antennas, and the efficiency of MIMO technology may be determined based on the accuracy of a precoding matrix and channel estimation.

The above information is presented as background information only to assist with an understanding of the disclosure. No determination has been made, and no assertion is made, as to whether any of the above might be applicable as prior art with regard to the disclosure.

SUMMARY

In order to use multiple input multiple output (MIMO) technology, a channel between a base station and an electronic device that accesses the base station may be estimated. If a time division duplex (TDD) band is used, channel reciprocity is established. Accordingly, an electronic device may transmit a signal (e.g., a sounding reference signal (SRS)) for channel estimation, and a base station may perform channel estimation and may calculate a precoding matrix. For example, the electronic device may transmit sounding reference signals by alternately using a plurality of antennas according to a transmit antenna switching (TAS) operation. However, if the electronic device is present in an emission environment in which an increase in channel capacity by MIMO technology is not expected, the transmission of a sounding reference signal according to a TAS operation may cause unnecessary power consumption.

Aspects of the disclosure are to address at least the above-mentioned problems and/or disadvantages and to provide at least the advantages described below. Accordingly, an aspect of the disclosure is to provide a method of transmitting a sounding reference signal by taking into consideration an emission environment, and an electronic device therefor.

Additional aspects will be set forth in part in the description which follows and, in part, will be apparent from the description, or may be learned by practice of the presented embodiments.

In accordance with an aspect of the disclosure, a method of an electronic device is provided. The method includes transmitting a signal via a first antenna subset including at least one of a plurality of antennas measuring the emission environment of the plurality of antennas, using the signal determining at least one antenna to be used for transmitting a sounding reference signal (SRS), based on the emission environment and transmitting the SRS via the at least one determined antenna. The emission environment may include the strength of a reflected signal that corresponds to the signal and is reflected by the first antenna subset, or the strength of a reception signal that corresponds to the signal and is received by a second antenna subset including at least one remaining antenna.

In accordance with another aspect of the disclosure an electronic device is provided. The electronic device includes a plurality of antennas at least one reception front end module (FEM) configured to process a reception signal received via at least one of the plurality of antennas at least one transmission/reception FEM configured to process a transmission signal transmitted via at least one of the plurality of antennas and a reception signal received via at least one of the plurality of antennas at least one switch configured to form a path among the at least one reception FEM, the at least one transmission FEM, and the plurality of antennas and at least one processor. The at least one processor is configured to transmit a signal via a first antenna subset including at least one of the plurality of antennas measure the emission environment of the plurality of antennas, using the signal determine at least one antenna to be used for transmission of a sounding reference signal (SRS), based on the emission environment and transmit the SRS via the at least one determined antenna. The emission environment includes the strength of a reflected signal that corresponds to the signal and is reflected by the first antenna subset, or the strength of a reception signal that corresponds to the signal and is received by a second antenna subset including at least one remaining antenna.

A method and an electronic device therefor, according to various embodiments of the disclosure, may examine an environment where a gain is obtained based on multiple input multiple output (MIMO) technology, and may selectively perform a transmit antenna switching (TAS) operation, thereby preventing unnecessary power consumption.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
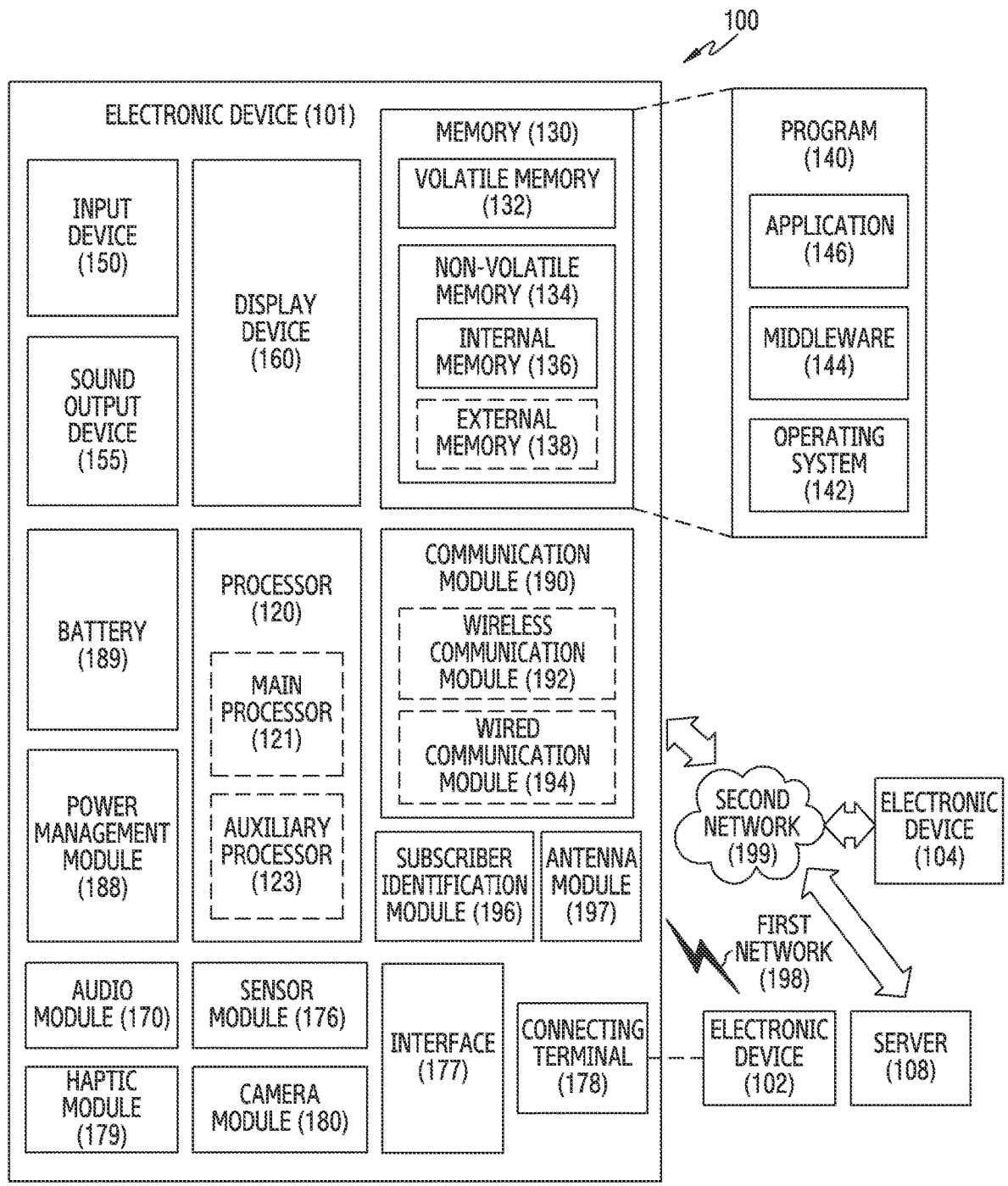
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments of the disclosure, at least one (e.g., the display device 160 or the camera module 180) of the components may be omitted from the electronic device 101, or one or more other components may be added in the electronic device 101. In some embodiments of the disclosure, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment of the disclosure, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment of the disclosure, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment of the disclosure, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment of the disclosure, the antenna module 197 may include an antenna including a radiating element composed of a conductive material or a conductive pattern formed in or on a substrate (e.g., printed circuit board (PCB)). According to an embodiment of the disclosure, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

An electronic device 101 configured as shown in FIG. 1 may access a base station. For example, the base station may comply with long term evolution (LTE), LTE-advanced (LTE-A), or the 5th generation (5G) standard. Multiple input multiple output (MIMO) technology may be used for increasing communication capacity between the base station and the electronic device 101. MIMO technology may transmit or receive different streams on the same frequency, using a plurality of antennas. MIMO technology enables an increase in a data transmission rate (data rate), which is theoretically proportional to the number of antennas. In order to improve MIMO gain, channel information of a channel from each antenna of a base station to each antenna of a terminal needs to be recognized, and a downlink precoding matrix needs to be generated based on the channel information.

The channel reciprocity of a time division duplex (TDD), which supports downlink communication and uplink communication in the same frequency, may be used for recognizing the channel information. If the channel reciprocity is established, the result of estimation of an uplink channel may be applied to a downlink channel. For example, channel information estimated using a sounding reference signal transmitted from the electronic device 101 may be used as channel information used for determining a downlink precoding matrix.

For channel estimation, which is required for MIMO transmission, the electronic device 101 may transmit a sounding reference signal (SRS). The SRS is transmitted for channel estimation, which is required for MIMO transmission, and thus, the SRS may be transmitted via a plurality of antennas which are to be used for MIMO reception. If SRSs are transmitted via a plurality of antennas, the electronic device 101 may transmit SRSs via the plurality of antennas according to a transmit antenna switching (TAS) operation.

Figure 2:
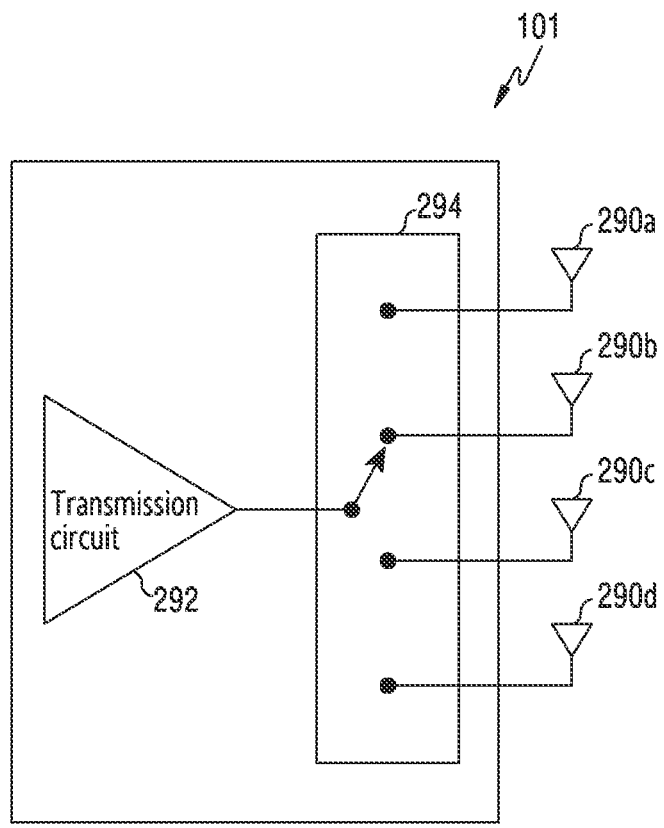
FIG. 2 is a diagram of an electronic device that performs a transmit antenna switching (TAS) operation according to an embodiment of the disclosure.

FIG. 2 is a diagram of an electronic device that performs a TAS operation according to an embodiment of the disclosure.

Referring to FIG. 2, the electronic device 101 may include a single transmission circuit 292. The transmission circuit 292 is a circuit including at least one of a power amplifier (PA), a low noise amplifier (LNA), a duplexer, a switch, or a filter, and may be referred to as a FEM. If sounding reference signals (SRSs) are transmitted via four antennas 290a, 290b, 290c, and 290d, it may be difficult to simultaneously transmit SRSs via the four antennas 290a, 290b, 290c, and 290d since the number of transmission circuits 292 are limited. According to the TAS operation, the transmission circuit 292 is sequentially connected to the four antennas 290a, 290b, 290c, and 290d using the switch 294. Accordingly, the electronic device 101 may transmit SRSs via the four antennas 290a, 290b, 290c, and 290d.

Figure 3A:
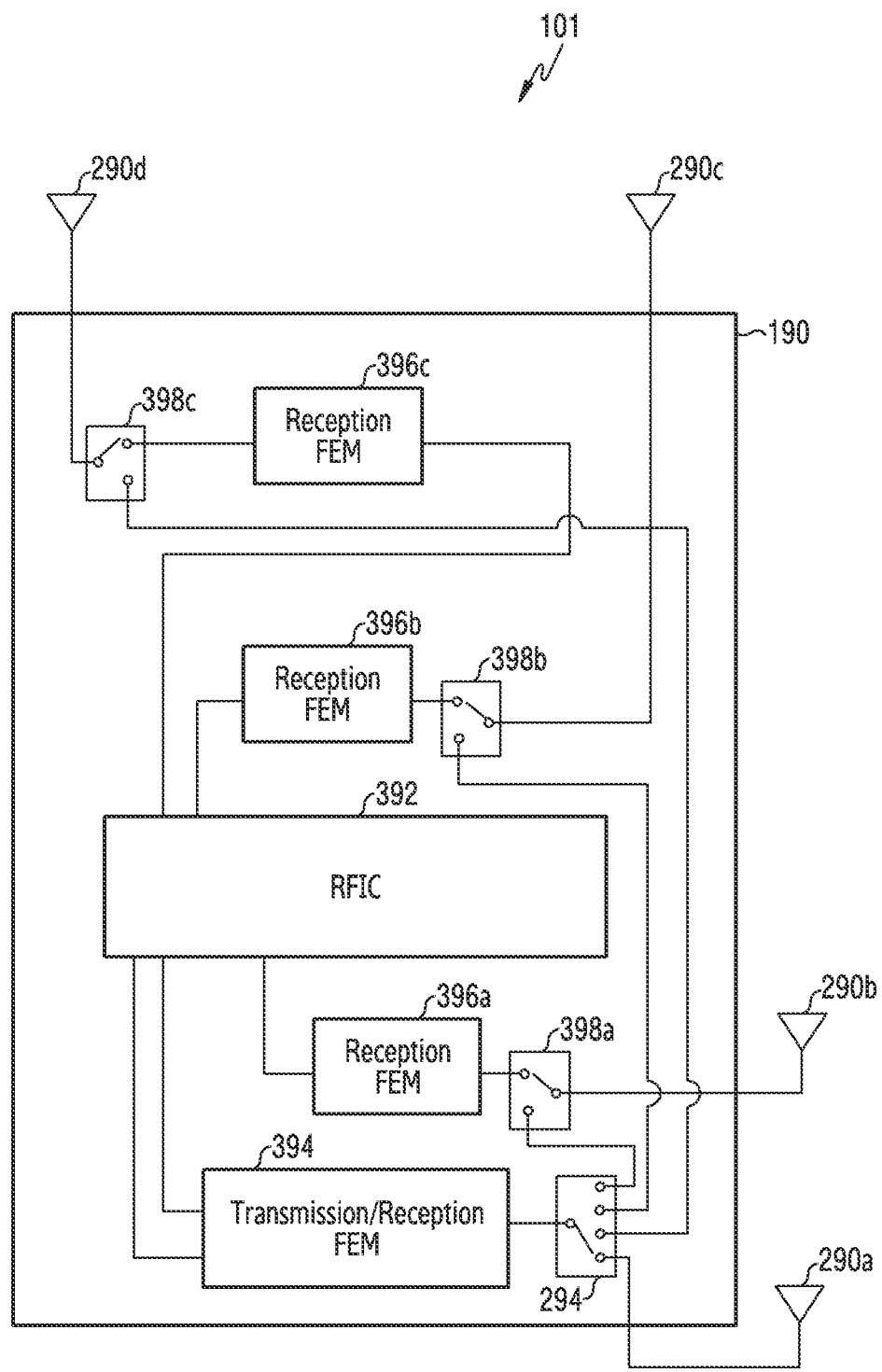
FIG. 3A is a block diagram of a communication module in an electronic device according to an embodiment of the disclosure.

FIG. 3A is a block diagram the communication module 190 in the electronic device 101 according to an embodiment of the disclosure. FIG. 3A illustrates the configuration of the communication module 190 for supporting the TAS operation, and the configuration includes four antennas and a single FEM including a transmission circuit.

Referring to FIG. 3A, the communication module 190 may include a first antenna 290a, a second antenna 290b, a third antenna 290c, a fourth antenna 290d, a radio frequency integrated circuit (RFIC) 392, a transmission/reception FEM 394, a transmission switch 294, a first reception FEM 396a, a first switch 398a, a second reception FEM 396b, a second switch 398b, a third reception FEM 396c, and/or a third switch 398c.

The first antenna 290a may be connected to the transmission/reception FEM 394 depending on the state of the transmission switch 294. The second antenna 290b may be connected to the transmission/reception FEM 394 or the first reception FEM 396a, depending on the states of the transmission switch 294 and the first switch 398a. The third antenna 290c may be connected to the transmission/reception FEM 394 or the second reception FEM 396b, depending on the states of the transmission switch 294 and the second switch 398b. The fourth antenna 290d may be connected to the transmission/reception FEM 394 or the third reception FEM 396c, depending on the states of the transmission switch 294 and the third switch 398c.

The RFIC 392 may generate a signal to be transmitted via at least one of the first antenna 290a, the second antenna 290b, the third antenna 290c, and the fourth antenna 290d, or may interpret a signal received via at least one of the first antenna 290a, the second antenna 290b, the third antenna 290c, and the fourth antenna 290d. The RFIC 392 may perform at least one of signal modulation/demodulation, frequency modulation, and/or analog/digital conversion.

The transmission/reception FEM 394 may include a circuit for processing a transmission signal and a reception signal. For example, the transmission/reception FEM 394 may perform at least one operation among amplification of a transmission signal, amplification of a reception signal, and/or filtering a transmission signal or reception signal. The transmission FEM 394 may be referred to as "transmission/reception path", "low noise amplifier power amplifier module—with duplexer (LPAMiD)", or other terms having a technical meaning equivalent thereto.

Each of the first reception FEM 396a, the second reception FEM 396b, and the third reception FEM 396c may include a circuit for processing a reception signal. For example, each of the first reception FEM 396a, the second reception FEM 396b, and the third reception FEM 396c may perform at least one operation among amplification of a reception signal and/or filtering a reception signal. Each of the first reception FEM 396a, the second reception FEM 396b, and the third reception FEM 396c may be referred to as "reception path", "low noise amplifier-FEM (LFEM)", or other terms having a technical meaning equivalent thereto.

The transmission switch 294, the first switch 398a, the second switch 398b, or the third switch 398c may form a signal path among different components. The connection state of each of the transmission switch 294, the first switch 398a, the second switch 398b, or the third switch 398c may be changed according to the control of the processor (e.g., a communication processor or the processor 120 of FIG. 1). According to an embodiment of the disclosure, if the TAS operation is performed, at least one of the first switch 398a, the second switch 398b, or the third switch 398c may be controlled to connect at least one of the first reception FEM 398a, the second reception FEM 398b, or the third reception FEM 398c, and the transmission switch 294, and the transmission switch 294 may be controlled to sequentially connect a selected number of antennas and the transmission/reception FEM 394.

Figure 3B:
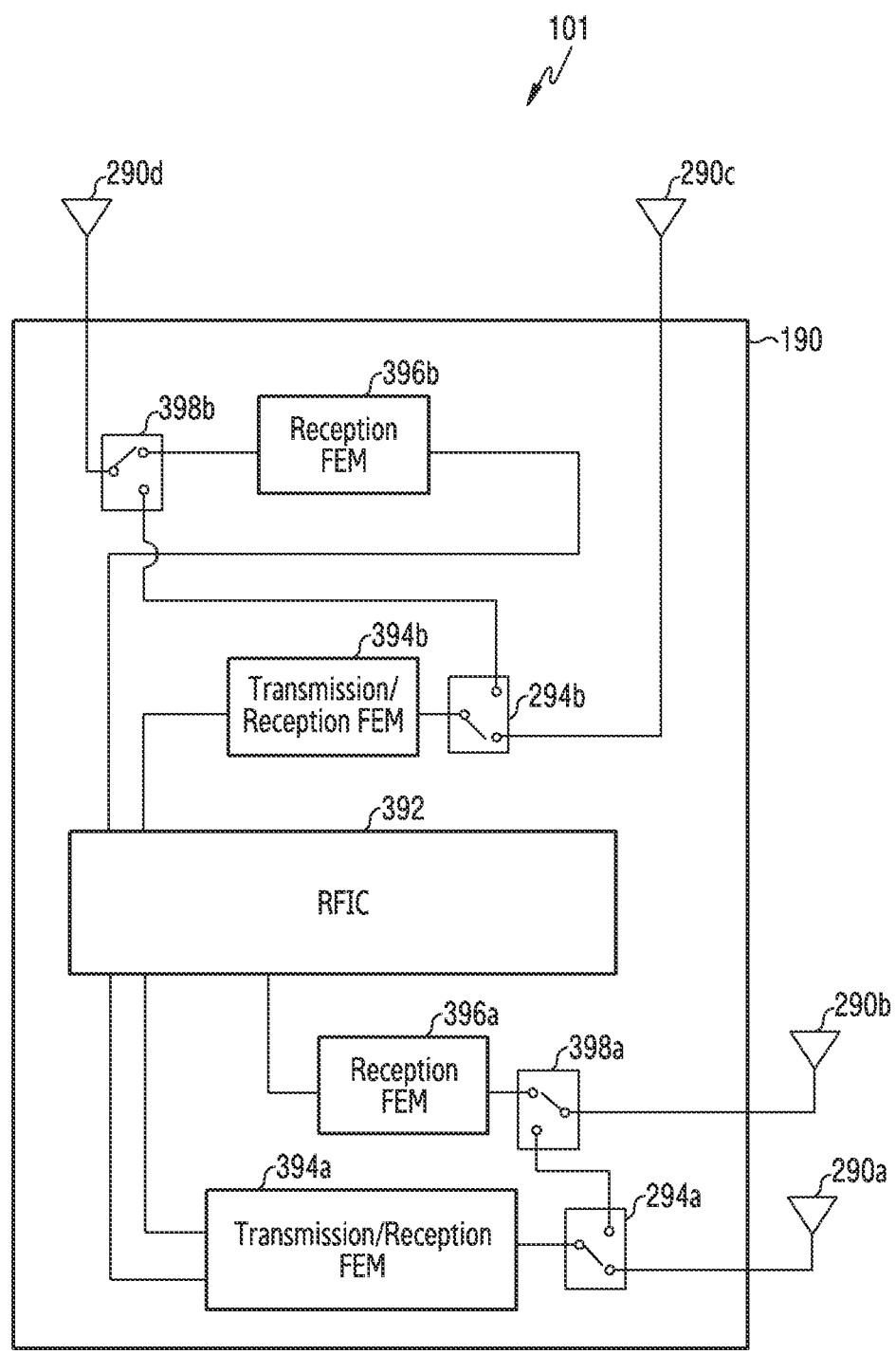
FIG. 3B is a block diagram of a communication module in an electronic device according to an embodiment of the disclosure.

FIG. 3B is a block diagram of a communication module in an electronic device according to an embodiment of the disclosure. FIG. 3B illustrates a configuration of the communication module 190 for supporting a TAS operation, and the configuration includes four antennas and two FEMs including transmission circuits.

Referring to FIG. 3B, the communication module 190 may include the first antenna 290a, the second antenna 290b, the third antenna 290c, the fourth antenna 290d, the RFIC 392, a first transmission/reception FEM 394a, a first transmission switch 294a, a second transmission/reception FEM 394b, a second transmission switch 294b, the first reception FEM 396a, the first switch 398a, the second reception FEM 396b, and/or the second switch 398b.

Each of the first antenna 290a and the second antenna 290b may be connected to the first transmission/reception FEM 394a or the first reception FEM 396a, depending on the states of the first transmission switch 294a and the first switch 398a which are controlled by a processor (e.g., a communication processor or the processor 120 of FIG. 1). Each of the third antenna 290c and the fourth antenna 290d may be connected to the second transmission/reception FEM 394b or the second reception FEM 396b, depending on the states of the second transmission switch 294b and the second switch 398b which are controlled by a processor (e.g., a communication processor or the processor 120 of FIG. 1).

According to the example of FIG. 3B, two transmission/reception FEMs 394a and 394b may be included, unlike FIG. 3A. The electronic device 101 may transmit sounding reference signals (SRSs) via two antennas (e.g., the first antenna 290a and the third antenna 290c) in parallel, using the two transmission/reception FEMs 394a and 394b.

FIG. 3A illustrates the case in which a single transmission circuit (e.g., the transmission/reception FEM 394) is included. FIG. 3B illustrates the case in which two transmission circuits (e.g., the first transmission/reception FEM 394a and the second transmission/reception FEM 394b) are included. According to other embodiments of the disclosure, although three or more transmission circuits are included, an antenna switching operation and/or operations according to various embodiments described below may be performed.

Figure 4:
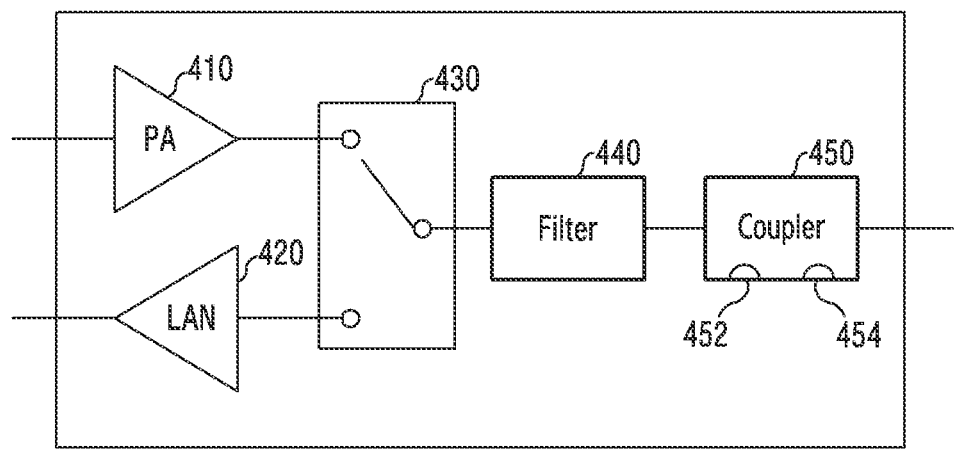
FIG. 4 is a block diagram of a transmission/reception front end module (FEM) of a communication module in an electronic device according to an embodiment of the disclosure.

FIG. 4 is a block diagram of a transmission/reception FEM (e.g., the transmission/reception FEM 394, 394a, or 394b) of the communication module in the electronic device according to an embodiment of the disclosure.

Referring to FIG. 4, the transmission/reception FEM 394, 394a, or 394b may include a power amplifier (PA) 410, a low noise amplifier (LNA) 420, a switch 430, a filter 440, and/or a coupler 450. A transmission signal may be amplified by the power amplifier 410, may pass through the switch 430, may be filtered by the filter 440 based on a transmission band, and may be output to an antenna. A reception signal provided from an antenna may be filtered by the filter 440 based on a reception band, may pass through the switch 430, and may be amplified by the low noise amplifier 420. According to another embodiment of the disclosure, the low noise amplifier 420 may be omitted. If the low noise amplifier 420 is omitted, an RFIC (e.g., the RFIC 392) that receives a reception signal may include a low noise amplifier. The coupler 450 may include a forward terminal 452 and/or a reverse terminal 454. The forward terminal 452 may be used to extract a signal delivered from the filter 440 to an antenna. The reverse terminal 454 may be used to extract a signal delivered from an antenna to the filter 440.

Figure 5:
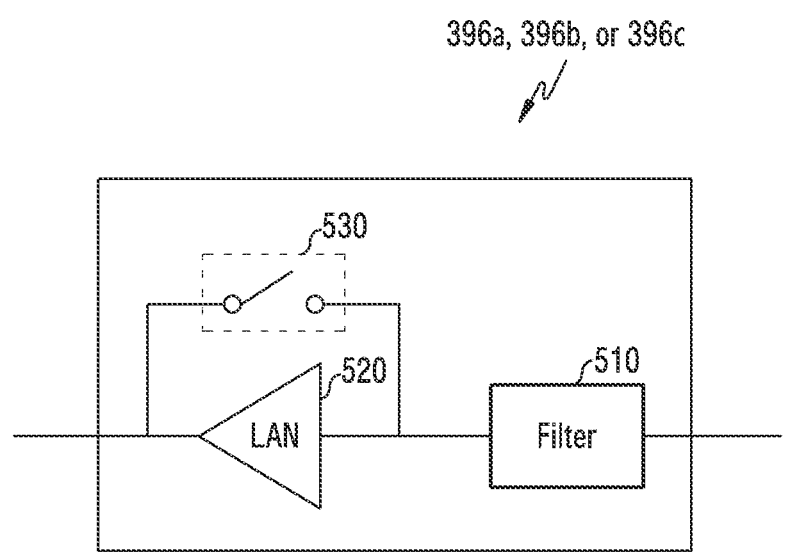
FIG. 5 is a block diagram of a reception FEM of a communication module in an electronic device according to an embodiment of the disclosure.

FIG. 5 is a block diagram of a reception FEM (e.g., the reception FEM 396a, 396b, or 396c) of a communication module in an electronic device according to an embodiment of the disclosure.

Referring to FIG. 5, the reception FEM 396a, 396b, or 396c may include a filter 510, a low noise amplifier 520, and/or a bypass path 530. A reception signal provided from an antenna may be filtered by the filter 510, may be amplified by the low noise amplifier 520 or may pass through the bypass path 530, and may be transferred to an RFIC (e.g., the RFIC 392).

According to various embodiments of the disclosure, an electronic device (e.g., the electronic device 101 of FIG. 1) may include a plurality of antennas (e.g., the antennas 290a, 290b, 290c, and 290d), at least one reception front end module (FEM) (e.g., reception FEMs 396a, 396b, and 396c) configured to process a reception signal received via at least one of the plurality of antennas; at least one transmission/reception FEM (e.g., transmission/reception FEM 394) configured to process a transmission signal transmitted via at least one of the plurality of antennas and a reception signal received via at least one of the plurality of antennas; at least one switch (e.g., the transmission switch 294, the first switch 398a, the second switch 398b, and the third switch 398c) configured to form a path among the at least one reception FEM, the at least one transmission FEM, and the plurality of antennas; and at least one processor (e.g., the processor 120 or the communication module 190). The at least one processor is configured to: transmit a signal via a first antenna subset (e.g., the first antenna 290*a*) including at least one of the plurality of antennas; measure the emission environment of the plurality of antennas, using the signal; determine at least one antenna to be used for transmission of a sounding reference signal (SRS), based on the emission environment; and transmit the SRS via the at least one determined antenna. The emission environment may include the strength of a reflected signal that corresponds to the signal and is reflected by the first antenna subset, or the strength of a reception signal that corresponds to the signal and is detected by a second antenna subset (e.g., the second antenna 290*b*, the third antenna 290*c*, and the fourth antenna 290*d*) including at least one remaining antenna.

According to various embodiments of the disclosure, the emission environment may be determined based on the ratio of the strength of the reflected signal to the strength of the signal, or the ratio of the strength of the reception signal to the strength of the signal.

According to various embodiments of the disclosure, the at least one processor (e.g., the processor 120 or the communication module 190) may further be configured to transmit the SCS by sequentially switching the at least one antenna.

According to various embodiments of the disclosure, the first antenna subset (e.g., the first antenna 290*a*) may include as many antennas as the number of the at least one transmission/reception FEMs.

According to various embodiments of the disclosure, the at least one processor (e.g., the processor 120 or the communication module 190) may further be configured to: measure the strength of a reflected signal corresponding to at least one antenna included in the first antenna subset (e.g., the first antenna 290*a*); and measure a strength of a reception signal detected by at least one antenna included in the second antenna subset if the strength of the reflected signal is less than a first threshold value.

According to various embodiments of the disclosure, the at least one processor (e.g., the processor 120 of the communication module 190) may further be configured to transmit, to a base station, capability information related to a transmit antenna switching (TAS) operation that transmits the SCS by sequentially switching the plurality of antennas (e.g., the antennas 290*a*, 290*b*, 290*c*, and 290*d*).

According to various embodiments of the disclosure, the capability information indicates at least one of whether to perform the TAS operation or a number of antennas switched by the TAS operation.

According to various embodiments of the disclosure, the at least one processor (e.g., the processor 120 or the communication module 190) may further be configured to change an antenna used for uplink communication with a base station, if the strength of the reflected signal exceeds a threshold value.

According to various embodiments of the disclosure, the at least one processor (e.g., the processor 120 or the communication module 190) may further be configured to measure the emission environment of the plurality of antennas, in response to start of a service that requires a data transmission rate greater than or equal to a threshold value, or in response to a data error rate, less than or equal to a threshold value, during multiple input multiple output (MIMO) reception.

According to various embodiments of the disclosure, the electronic device 101 may perform a TAS operation using the above-mentioned configuration. In association with performing a TAS operation, the electronic device 101 may measure an emission environment, and may control whether to perform the TAS operation and/or a configuration associated with the TAS operation, based on the emission environment. The emission environment may be related to a quality of a channel that a plurality of antennas, which may be switched by the TAS operation, may experience, and may be related to whether a gain occurs by MIMO technology. The emission environment may be related to a factor that occurs during a relatively long period of time, such as a condition of holding or a weak electric field, as opposed to a short time fading which occurs randomly.

Figure 6:
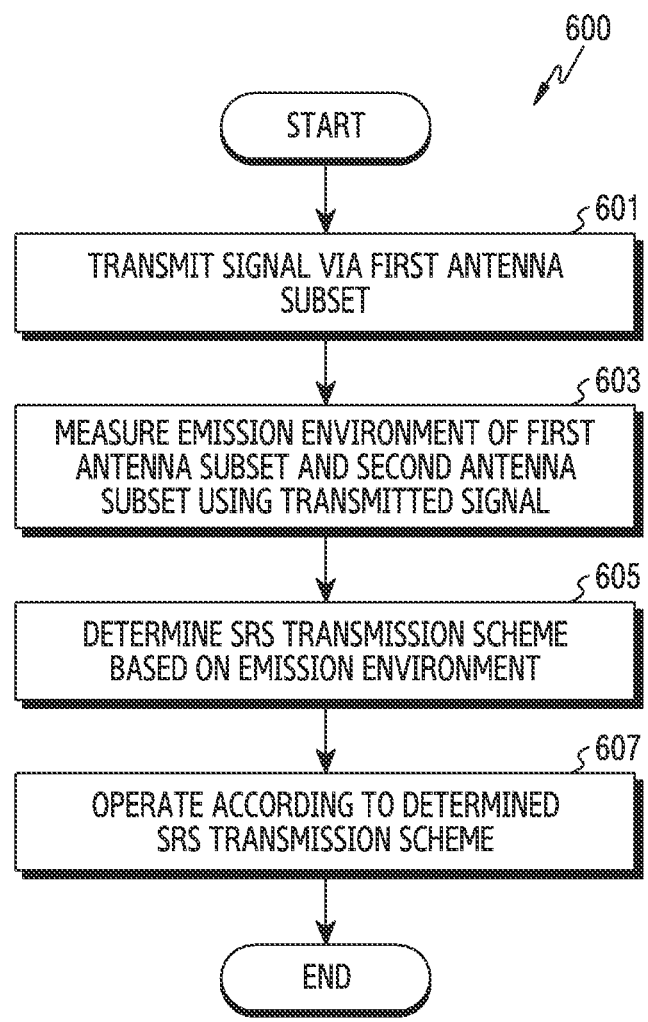
FIG. 6 is a flowchart illustrating a process of transmitting a sounding reference signal (SRS), by an electronic device according to an embodiment of the disclosure.

FIG. 6 is a flowchart 600 illustrating a process of transmitting a sounding reference signal (SCS) by an electronic device according to an embodiment of the disclosure. The subject that performs the operations in the flowchart 600 of FIG. 6 may be understood as the electronic device 101 or the components (e.g., the processor 120 or the communication module 190) of the electronic device 101.

Referring to FIG. 6, in operation 601, the electronic device 101 (e.g., the processor 120 or the communication module 190) may transmit a signal via a first antenna subset. The signal may be transmitted via an uplink resource allocated by a base station for uplink communication. The signal may include data (e.g., traffic or control information) for communication with the base station. The first antenna subset may include at least one antenna allocated for uplink communication, for example, the first antenna 290*a* of FIG. 3A. For example, an uplink signal generated by the RFIC 392 may be processed by the transmission/reception FEM 394, and may be transmitted via the first antenna 290*a*.

In operation 603, the electronic device 101 may measure the emission environment of the first antenna subset and a second antenna subset using the transmitted signal. The second antenna subset may include at least one antenna, remaining after excluding at least one antenna included in the first antenna subset, among the usable antennas. For example, while performing uplink communication, the electronic device 101 may measure the emission environment of the first antenna subset and the second antenna subset, without generating an additional signal. The emission environment may be measured in order to estimate the level of gain which may be obtained when MIMO reception is performed using the first antenna subset and the second antenna subset. For example, if an antenna is blocked due to holding by a user, the emission environment may be measured to be poor when the electronic device 101 enters a weak electric field.

In operation 605, the electronic device 101 may determine the transmission scheme of a sounding reference signal (SRS), based on the emission environment. The transmission scheme of an SRS may include the number of antennas to be used for transmitting an SRS and/or whether to transmit an SRS. For example, the number of antennas to be used for transmitting an SRS may depend on the number of antennas that are present in an emission environment above a predetermined level.

In operation 607, the electronic device 101 may operate according to the determined transmission scheme of an SRS. If it is determined that a plurality of antennas are to be used for transmitting an SRS, the electronic device 101 may transmit SRSs via a plurality of antennas using a TAS operation. If it is determined that a single antenna is to be used for transmitting an SRS, the electronic device may transmit an SRS without performing a TAS operation.

Figure 7A:
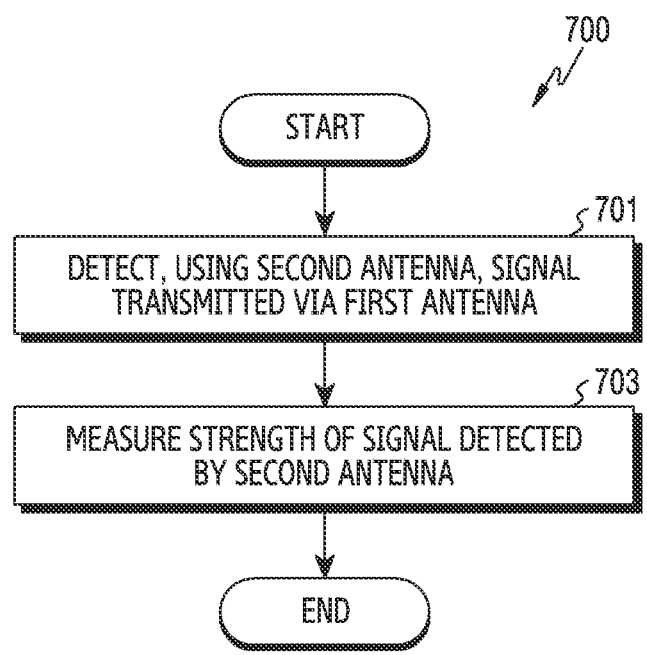
FIG. 7A is a flowchart illustrating a process of measuring an emission environment using a reception signal, by an electronic device according to an embodiment of the disclosure.

FIG. 7A is a flowchart 700 illustrating a process of measuring an emission environment using a reception signal, by an electronic device according to an embodiment of the disclosure. The subject that performs the operations in the flowchart 700 of FIG. 7A may be understood as the electronic device 101 or the components (e.g., the processor 120 or the communication module 190) of the electronic device 101. FIG. 7A illustrates operations for measuring an emission environment for at least one antenna included in a second antenna subset. Hereinafter, a first antenna is included in a first antenna subset, and a second antenna is included in the second antenna subset.

Referring to FIG. 7A, in operation 701, the electronic device 101 (e.g., the processor 120, the communication module 190, or the RFIC 392) may receive, using the second antenna, a signal transmitted via the first antenna. In order to perform uplink communication using an uplink resource allocated by a base station, the electronic device 101 may transmit a signal via the first antenna. The signal transmitted via the first antenna may be received via the second antenna included in the electronic device 101.

In operation 703, the electronic device 101 may measure the strength of the signal received by the second antenna. The electronic device 101 may process the signal received by the second antenna, and may measure the strength of the signal, using a reception circuit (e.g., the reception FEM 396a) which is not used for communication with the base station during uplink communication. The strength of the signal received by the second antenna may be used as an index indicating a channel state associated with the second antenna (e.g., the state of being blocked by an obstacle or the state of being in a weak electric field). The fact that the signal that is transmitted via the first antenna and is received by the second antenna has a high strength may mean that a signal that is to be transmitted from the base station and is to be received by the second antenna may also have a high strength.

The operations for measuring an emission environment, which have been described with reference to FIG. 7A, will be described based on the configuration of a circuit with reference to FIG. 7B.

Figure 7B:
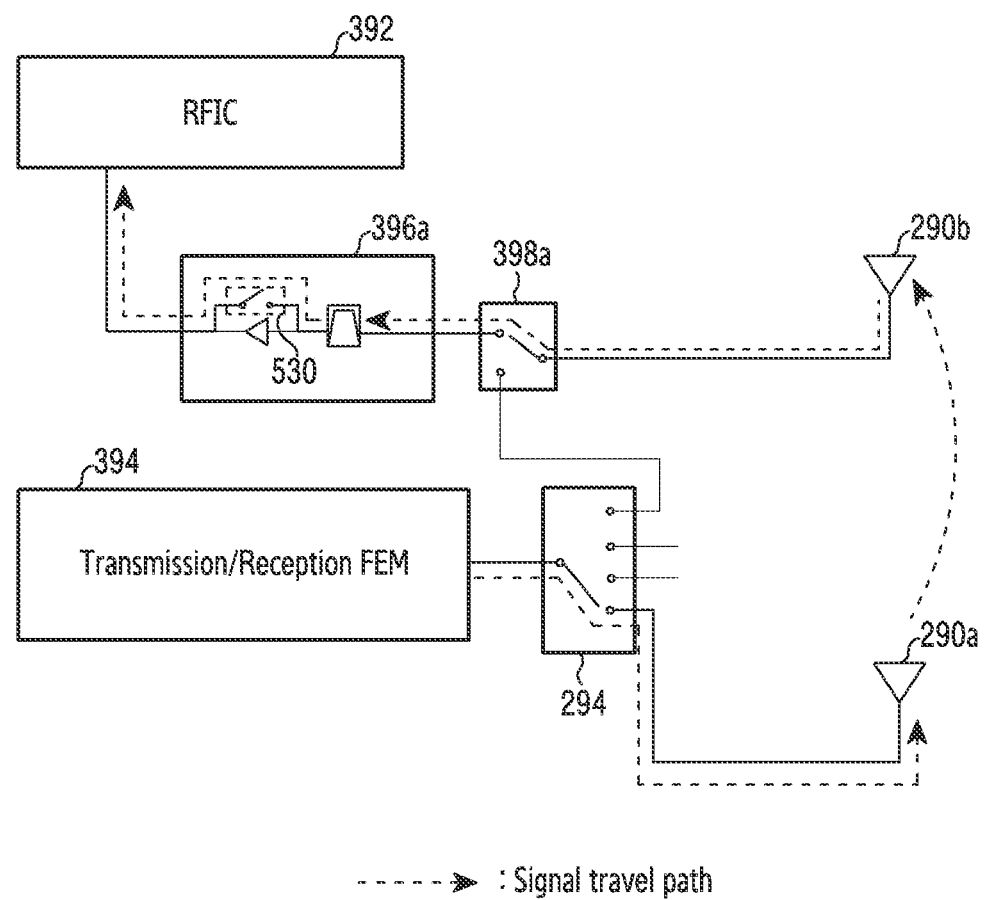
FIG. 7B is a diagram illustrating circuits used when an electronic device measures an emission environment using a reception signal according to an embodiment of the disclosure.

FIG. 7B is a diagram illustrating circuits used when an electronic device measures an emission environment using a reception signal according to an embodiment of the disclosure.

Referring to FIG. 7B, the transmission switch 294 may form a path between the transmission/reception FEM 394 and the first antenna 290a, and the first switch 398a may form a path between the reception FEM 396a and the second antenna 290b. A signal that is transmitted via the first antenna 290a after passing through the transmission/reception FEM 394 may be received by the second antenna 290b, and the received signal may be provided to the reception FEM 396a. The received signal may pass through a bypass path 530 of the reception FEM 396a, and may be provided to the RFIC 392. The RFIC 392 may measure the strength of the signal, and may determine a value indicating the emission environment of the second antenna 290b.

In the embodiment described with reference to FIG. 7B, the signal may pass through the bypass path 530, and may be provided to the RFIC 392. For example, if the isolation between antennas is about 35 dB, although a low transmission power is used (e.g., 0 dBm), a signal with a power greater than a reception power of about −35 dBm may be detected. Since the power of the detected signal is greater than the power of the reception signal from the base station, it is determined that the measured value is reliable although the signal passes through the bypass path 530 of the reception FEM 396a. According to other embodiments of the disclosure, the signal may pass through a low noise amplifier (e.g., the low noise amplifier 520) and may be provided to the RFIC 392. For example, a received signal is configured to always pass through a low noise amplifier, or is configured to selectively pass through a low noise amplifier according to the size of a signal.

As described with reference to FIGS. 7A and 7B, the value indicating the emission environment of the second antenna (e.g., the second antenna 290b) may be determined based on the strength of a received signal. Although an external environment does not change, the strength of a received signal may depend on the strength of a transmitted signal. However, the performance or efficiency of an antenna does not change depending on the strength of a transmitted signal. The ratio of the strength of a transmitted signal to the strength of a received signal may be expected to be constant if the external environment does not change. The ratio of the strength of a transmitted signal to the strength of a received signal may be constant if the external environment does not change. According to an embodiment of the disclosure, the value indicating the emission environment of the second antenna 290b may be determined based on a result of comparison between the strength of a signal transmitted via the first antenna (e.g., the first antenna 290a) and the strength of a signal received via the second antenna 290b. The strength of a transmitted signal may be determined based on the strength of a forward signal extracted by a coupler (e.g., the coupler 450) in a transmission/reception FEM, or based on the strength of a signal generated from an RFIC (e.g., the RFIC 392).

Figure 8A:
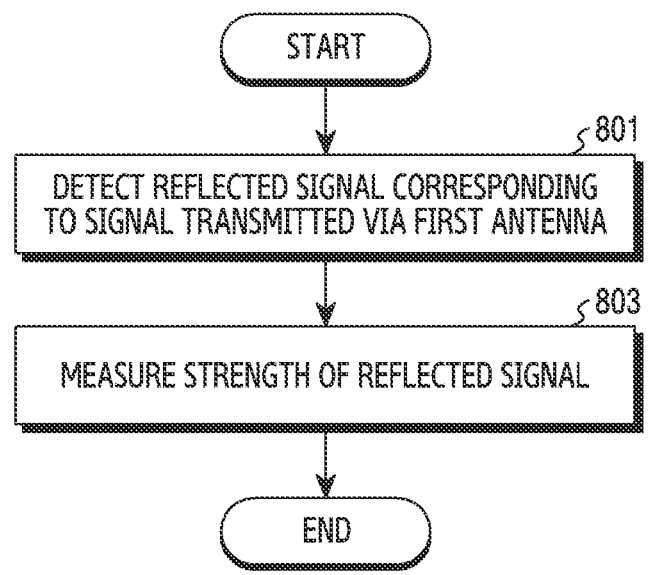
FIG. 8A is a flowchart illustrating a process of measuring an emission environment using a reflected signal, by an electronic device according to an embodiment of the disclosure.

FIG. 8A is a flowchart illustrating a process of measuring an emission environment using a reflected signal, by an electronic device according to an embodiment of the disclosure. The subject that performs the operations in the flowchart of FIG. 8A may be understood as the electronic device 101 or the components (e.g., the processor 120 or the communication module 190) of the electronic device 101. FIG. 8A illustrates operations of measuring an emission environment for at least one antenna included in a first antenna subset. Hereinafter, a first antenna may be included in the first antenna subset.

Referring to FIG. 8A, in operation 801, the electronic device 101 (e.g., the processor 120 or the communication module 190) may detect a reflected signal that corresponds to a signal transmitted via the first antenna. In order to perform uplink communication using an uplink resource allocated by a base station, the electronic device 101 may transmit a signal via the first antenna. If a signal is output from a transmission circuit to an antenna for uplink communication, a part of the signal may not be emitted via the antenna but may be reflected. In order to detect the reflected signal, the electronic device 101 may perform coupling of the reflected signal in the transmission circuit.

In operation 803, the electronic device 101 may measure the strength of the reflected signal. The strength of the reflected signal from the first antenna may be used as an index indicating a channel state associated with the first antenna (e.g., the state of being blocked by an obstacle or the state of being in a weak electric field). The fact that a reflected signal from the first antenna is detected and the detected reflected signal has a high strength may mean that the first antenna is in a poor emission environment.

The operations for measuring an emission environment, which have been described with reference to FIG. 8A, will be described based on the configuration of a circuit with reference to FIG. 8B.

Figure 8B:
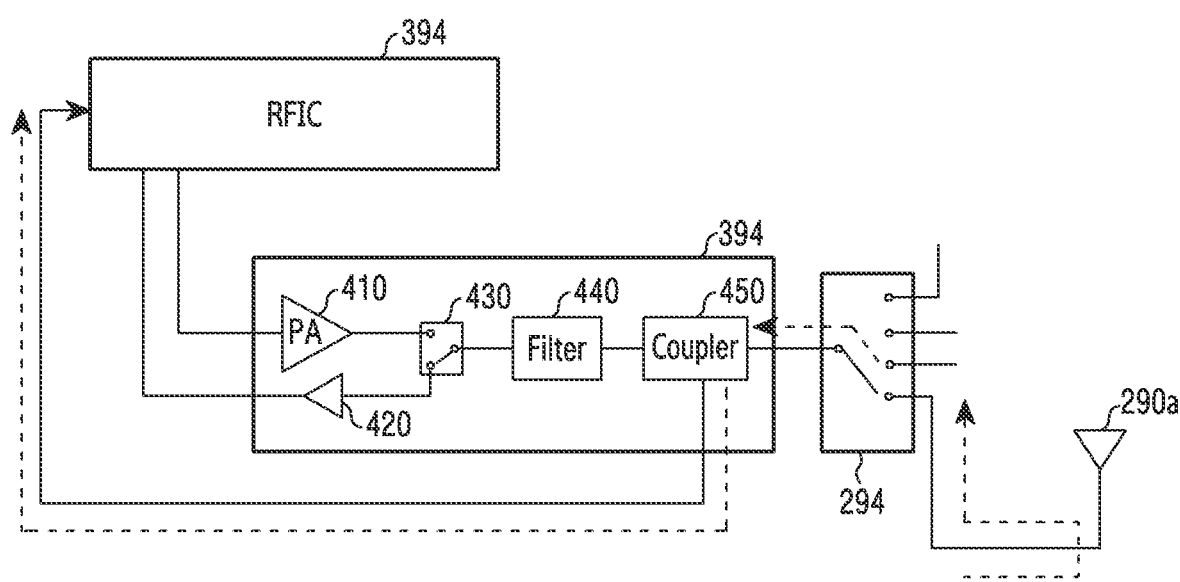
FIG. 8B is a diagram illustrating circuits used when an electronic device measures an emission environment using a reflected signal according to an embodiment of the disclosure.

FIG. 8B is a diagram illustrating circuits used when an electronic device measures an emission environment using a reflected signal according to an embodiment of the disclosure.

Referring to FIG. 8B, the transmission switch 294 may form a path between the transmission/reception FEM 394 and the first antenna 290a. A part of a signal, which is transmitted via the first antenna 290a after passing through the transmission/reception FEM 394, may be reflected. The coupler 450 in the transmission/reception FEM 394 may extract a reflected signal using a terminal (e.g., the reverse terminal 454) for extracting a reverse signal. The extracted signal may be provided to the RFIC 392. The RFIC 392 may measure the strength of the reflected signal, and may determine a value indicating the emission environment of the first antenna 290a. For example, the RFIC 392 may digitalize the reflected signal using an analog to digital converter (ADC), and may measure the strength of the signal.

As described with reference to FIGS. 8A and 8B, the value indicating the emission environment for the first antenna (e.g., the first antenna 290a) may be determined based on the strength of a reflected signal. Although an external environment does not change, the strength of a reflected signal may depend on the strength of a transmitted signal. However, the performance or efficiency of an antenna does not change depending on the strength of a transmitted signal. The ratio of the strength of a transmitted signal to the strength of a reflected signal may be expected to be constant if the external environment does not change. The ratio of the strength of a transmitted signal to the strength of a reflected signal may be constant if the external environment does not change. According to an embodiment of the disclosure, the value indicating the emission environment of the first antenna 290a may be determined based on a result of comparison between the strength of a signal transmitted via the first antenna (e.g., the first antenna 290a) and the strength of a signal received via the first antenna 290a. The strength of a transmitted signal may be determined based on the strength of a forward signal extracted by a coupler (e.g., 450) in a transmission/reception FEM, or based on the strength of a signal generated from an RFIC (e.g., the RFIC 392).

The operations described with reference to FIGS. 7A and 7B may be repeated as many times as the number of antennas included in the second antenna subset, and the operations described with reference to FIGS. 8A and 8B may be repeated as many times as the number of antennas included in the first antenna subset. For example, if the first antenna subset includes a single antenna and the second antenna subset includes three antennas, the travel path of a signal according to the measurement of the emission environment may be as shown in FIG. 9.

Figure 9:
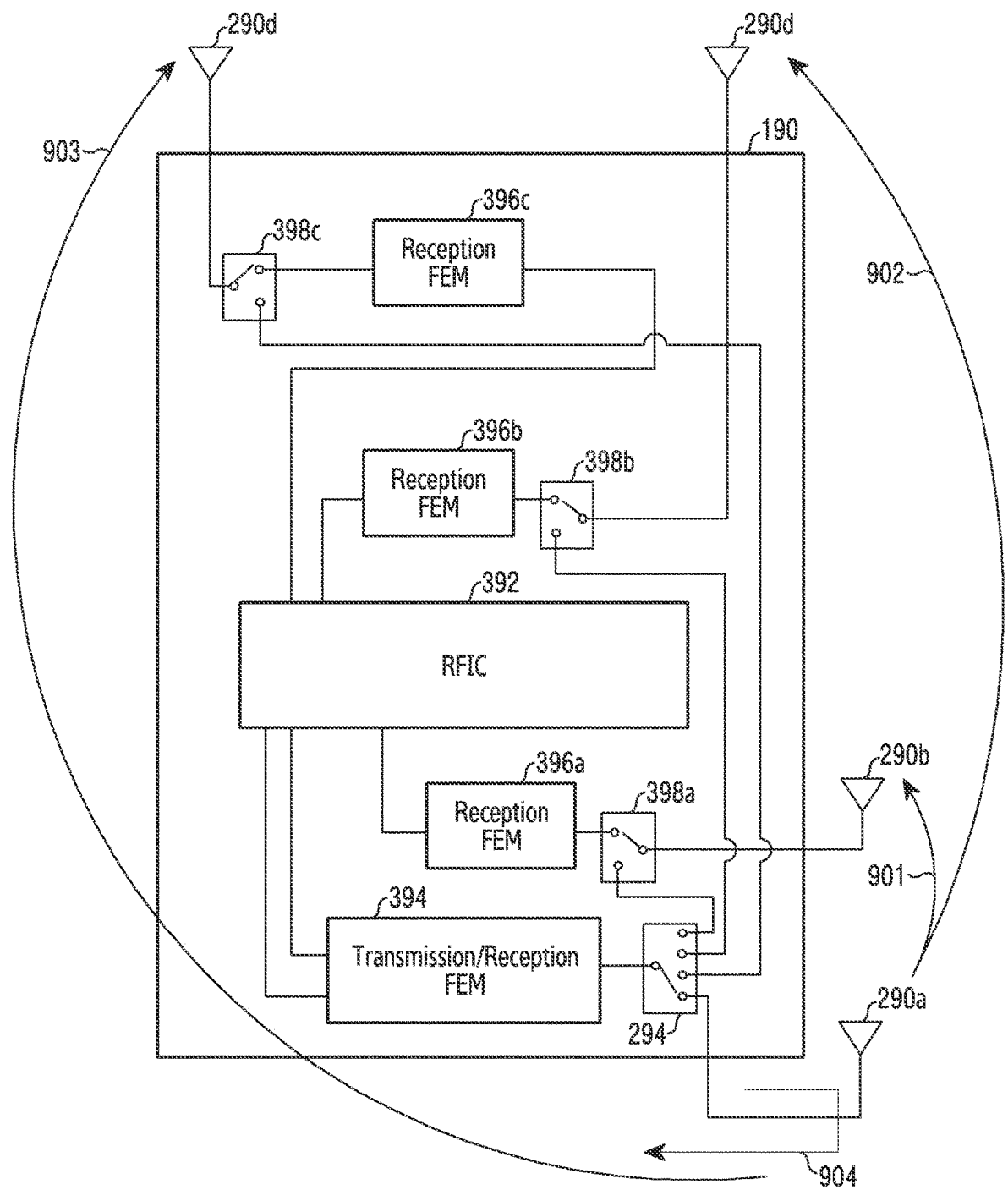
FIG. 9 is a diagram illustrating a travel path of a signal used when an electronic device measures an emission environment according to an embodiment of the disclosure.

FIG. 9 is a diagram illustrating a travel path of a signal used when the electronic device 101 measures an emission environment according to an embodiment of the disclosure.

Referring to FIG. 9, if a transmission signal is emitted via the first antenna 290a for uplink transmission, the transmission signal may arrive at the second antenna 290b via a first path 901, may arrive at the third antenna 290c via a second path 902, or may arrive at the fourth antenna 290d via a third path 903. A part of the transmission signal may be reflected by the first antenna 290a, and the reflected signal may flow in a circuit via a fourth path 904. By measuring the strength of the transmission signal or a part of the transmission signal that moves via the first path 901, the second path 902, the third path 903, or the fourth path 904, the electronic device 101 may measure an emission environment for the antennas 290a, 290b, 290c, and 290d.

Figure 10:
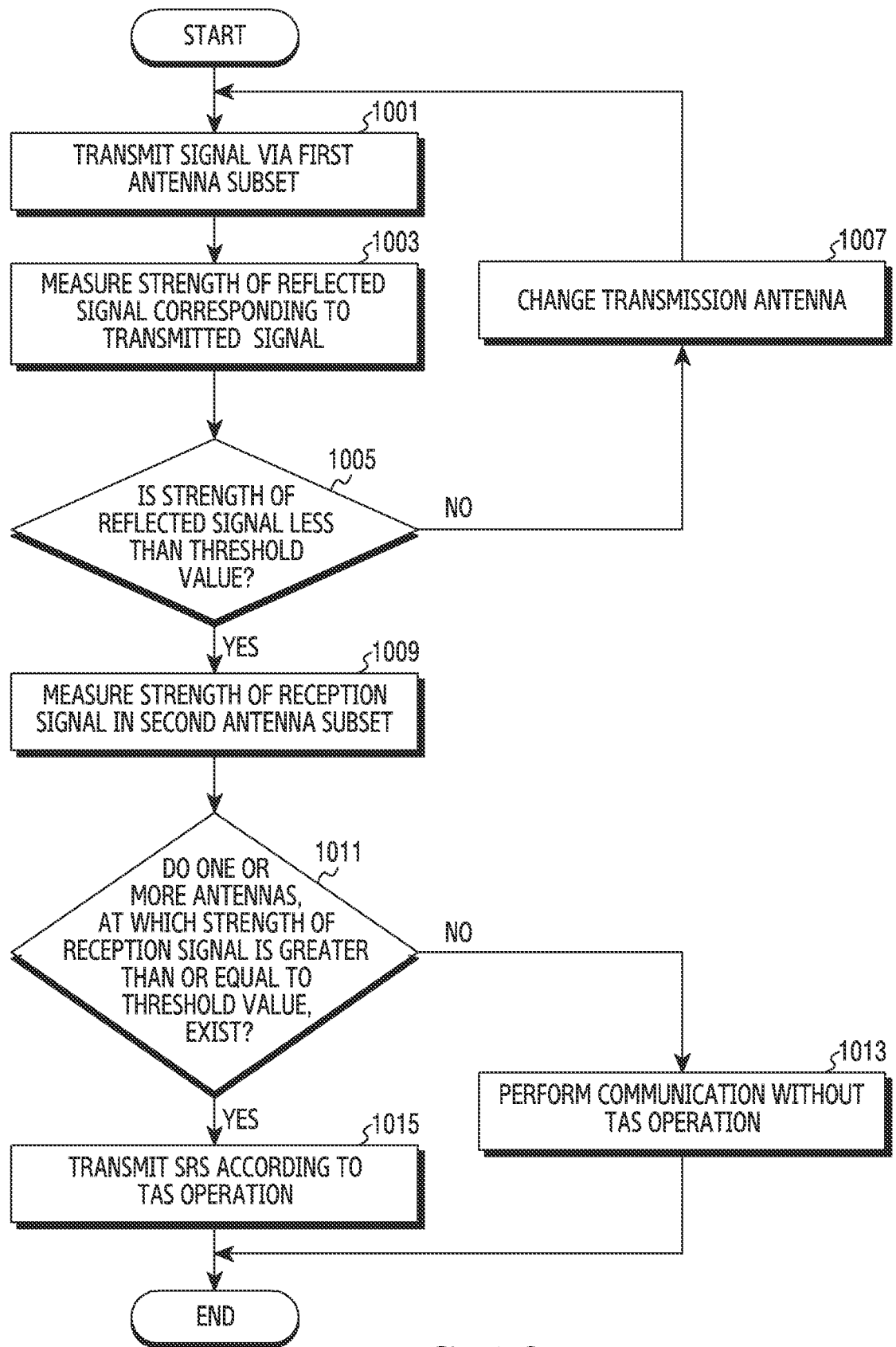
FIG. 10 is a flowchart illustrating a process of transmitting a sounding reference signal, by an electronic device according to an embodiment of the disclosure.

FIG. 10 is a flowchart 1000 illustrating a process of transmitting a sounding reference signal (SRS), by an electronic device according to an embodiment of the disclosure. The subject that performs the operations in the flowchart 1000 of FIG. 10 may be understood as the electronic device 101 or the components (e.g., the processor 120 or the communication module 190) of the electronic device 101.

Referring to FIG. 10, in operation 1001, the electronic device 101 (e.g., the processor 120 or the communication module 190) may transmit a signal via a first antenna subset. The first antenna subset may include at least one antenna connected to a transmission circuit (e.g., the transmission/reception FEM 394). The electronic device 101 may transmit a signal including uplink data (e.g., traffic or control information) for communication with a base station.

In operation 1003, the electronic device 101 may measure the strength of a reflected signal corresponding to the transmitted signal. The electronic device 101 may detect the reflected signal, which is not transmitted via the first antenna subset but is reflected, and may measure the strength of the reflected signal.

In operation 1005, the electronic device 101 may identify whether the strength of the reflected signal is less than a threshold value. For example, the threshold value may be defined. The electronic device 101 may evaluate the emission environment of at least one antenna included in the first antenna subset, for example, the emission environment of a transmission antenna, based on the strength of the reflected signal.

If the strength of the reflected signal is greater than or equal to the threshold value, the electronic device 101 may change the transmission antenna in operation 1007. The fact that the strength of the reflected signal is greater than or equal to the threshold value means that the emission environment is poor. Accordingly, the electronic device 101 may change an antenna used for transmission to another antenna.

If the strength of the reflected signal is less than the threshold value, the electronic device 101 may measure the strength of a reception signal in a second antenna subset in operation 1009. A reception circuit is not used for uplink communication, and thus, the electronic device 101 may process a signal, which is transmitted via the first antenna subset and is received via least one antenna included in the second antenna subset, using the reception circuit.

In operation 1011, the electronic device 101 may identify whether one or more antennas, at which the strength of a reception signal is greater than or equal to a threshold value, exist. The electronic device 101 may identify the number of antennas that detect a signal of which the strength is greater than or equal to the threshold value, among at least one antenna included in the second antenna subset.

If the number of antennas, at which the strength of a reception signal is greater than or equal to the threshold value, is fewer than one, the electronic device 101 may perform communication without a TAS operation in operation 1013. For example, the electronic device 101 may transmit a sounding signal using at least one antenna included in the first antenna subset, or may operate without transmission of a sounding signal. According to an embodiment of the disclosure, if a plurality of antennas are included in the first antenna subset, for example, if a plurality of transmission circuits are included, the electronic device 101 may transmit SRSs via the plurality of antennas included in the first antenna subset using a TAS operation.

If one or more antennas, at which the strength of a reception signal is greater than or equal to the threshold value, exist, the electronic device 101 may transmit an SRS using a TAS operation in operation 1015. At least one antenna included in the first antenna subset and at least one antenna included in the second antenna subset are usable for transmission of an SRS, and thus, the electronic device 101 may use at least two antennas. The electronic device 101 may transmit SRSs via at least two antennas using a TAS operation.

According to above-described various embodiments of the disclosure, the electronic device 101 may determine the number of antennas used for transmitting an SRS, based on the emission environment of antennas. According to an embodiment of the disclosure, if the number of antennas is determined, the electronic device 101 may transmit TAS operation-related information to a base station. For example, the TAS operation-related information is capability information of the electronic device 101, and may indicate at least one of whether to perform a TAS operation, the number of antennas switched by a TAS operation, and/or the number of streams supportable for MIMO reception. For example, if the emission environment of two or more and less than four antennas is good (e.g., the strength of a reflected signal is less than a first threshold value or the strength of a received signal is greater than or equal to a second threshold value), the electronic device 101 may transmit capability information indicating that a TAS operation using two antennas is allowed or a two-receive (RX) MIMO operation is allowed. For example, if the emission environment for four antennas is good (e.g., the strength of a reflected signal is less than a first threshold value or the strength of a received signal is greater than or equal to a second threshold value), the electronic device 101 may transmit capability information indicating that a TAS operation using four antennas is allowed and capability information indicating that a four-RX MIMO operation is allowed.

The TAS operation-related information, which is transmitted to a base station, may be utilized for scheduling by the base station. The base station may determine the amount of resources (e.g., the number of symbols) used for transmission of an SRS, based on the TAS operation-related information, and may determine the number of streams to be transmitted via MIMO transmission. For example, based on the number of antennas to be switched by a TAS operation, the base station may allocate a resource for transmitting an SRS for the electronic device 101. For example, if the TAS operation is not performed, the base station may not perform MIMO transmission for the electronic device 101, and may not allocate a resource for transmitting an SRS.

Figure 11:
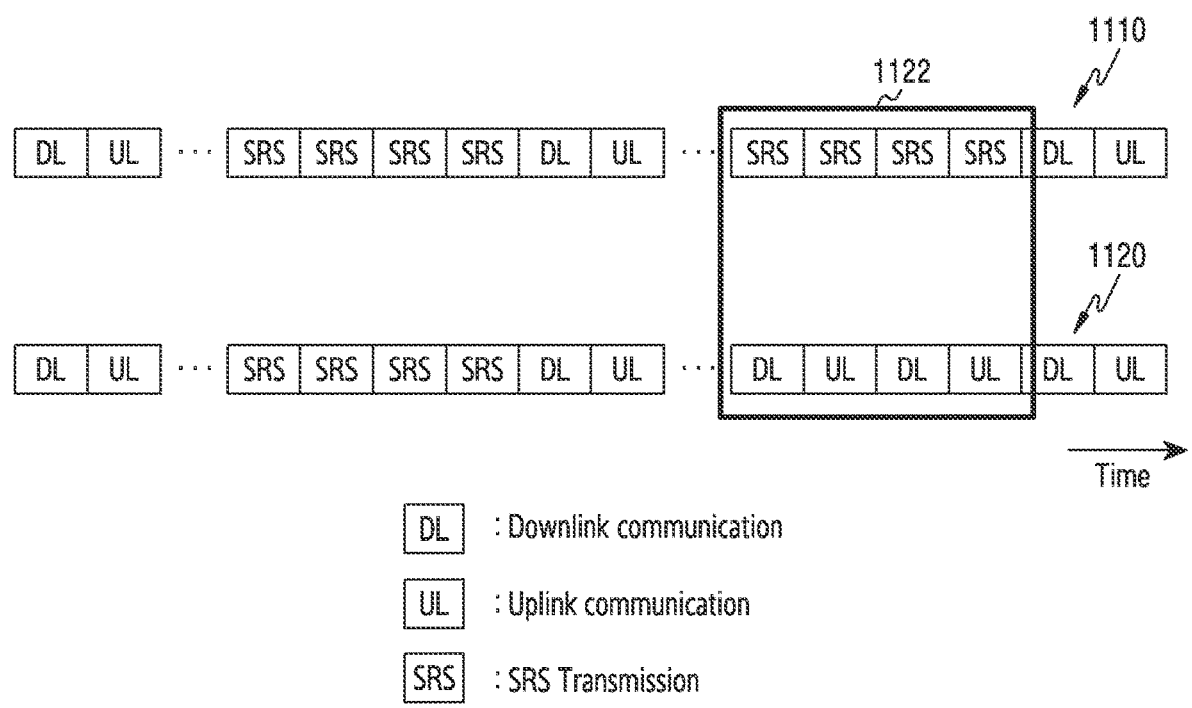
FIG. 11 is a diagram illustrating resource usage by an electronic device according to an embodiment of the disclosure.

FIG. 11 is diagram illustrating examples of resource usage by an electronic device according to an embodiment of the disclosure.

Referring to FIG. 11, sounding reference signals (SRSs) may be transmitted in a plurality of symbols or slots. In an interval 1122, the electronic device 101 may be scheduled to transmit SRSs according to a first situation 1110. However, according to a second situation 1120, the electronic device 101 may be scheduled to perform downlink communication or uplink communication without transmission of SRSs. For example, according to the second situation 1120, the electronic device 101 may transmit capability information, indicating not performing of a TAS operation, to a base station, before the interval 1122. Accordingly, the base station may not allocate a resource for transmitting an SRS in the interval 1122.

According to above-described various embodiments of the disclosure, the electronic device 101 may measure an emission environment, and may determine whether to perform a TAS operation according to the measured emission environment. According to an embodiment of the disclosure, if a predetermined condition is satisfied, the electronic device 101 may measure an emission environment in order to determine whether to perform a TAS operation. For example, an emission environment may be measured if a change in the emission environment is expected, or if MIMO reception is needed. For example, in response to start of a service that requires a data transmission rate greater than or equal to a threshold value, a data error rate less than or equal to a threshold value during MIMO reception, and a rapid increase in a data error rate during MIMO reception, the electronic device 101 may perform operations of measuring an emission environment.

According to various embodiments of the disclosure, a method of an electronic device (e.g., the electronic device 101 of FIG. 1) may include: transmitting a signal via a first antenna subset (e.g., the first antenna 290a) including at least one of a plurality of antennas (e.g., antennas 290a, 290b, 290c, and 290d); measuring an emission environment of the plurality of antennas, using the signal; determining at least one antenna to be used for transmitting a sounding reference signal (SRS), based on the emission environment; and transmitting the SRS via the at least one determined antenna. The emission environment may include the strength of a reflected signal that corresponds to the signal and is reflected by the first antenna subset, or the strength of a reception signal that corresponds to the signal and is detected by a second antenna subset (e.g., the second antenna 290b, the third antenna 290c, and the fourth antenna 290d) including at least one remaining antenna.

According to various embodiments of the disclosure, the emission environment may be determined based on the ratio of the strength of the reflected signal to the strength of the signal, or the ratio of the strength of the reception signal to the strength of the signal.

According to various embodiments of the disclosure, the operation of transmitting the reference signal may include: transmitting the SCS by sequentially switching the at least one antenna.

According to various embodiments of the disclosure, the first antenna subset (e.g., the first antenna 290a) may include as many antennas as the number of front end modules (FEMs) (e.g., the transmission/reception FEM 394) for transmission.

According to various embodiments of the disclosure, the signal transmitted via the first antenna subset may be transmitted via a resource allocated for uplink communication with a base station.

According to various embodiments of the disclosure, the operation of measuring the emission environment of the plurality of antennas (e.g., the antennas 290a, 290b, 290c, and 290d) using the signal may include: measuring the strength of a reflected signal corresponding to at least one antenna included in the first antenna subset (e.g., the first antenna 290a); and if the strength of the reflected signal is less than a first threshold value, measuring a strength of a reception signal detected by at least one antenna included in the second antenna subset.

According to various embodiments of the disclosure, the method may further include: transmitting, to a base station, capability information related to a transmit antenna switching (TAS) operation which transmits the SCS by sequentially switching the plurality of antennas (e.g., the antennas 290a, 290b, 290c, and 290d). The capability information may indicate at least one of whether to perform the TAS operation, or a number of antennas to be switched by the TAS operation.

According to various embodiments of the disclosure, the method may further include: changing an antenna used for uplink communication with a base station if the strength of the reflected signal exceeds a threshold value.

According to various embodiments of the disclosure, the operation of measuring the emission environment of the plurality of antennas (e.g., the antennas 290a, 290b, 290c, and 290d) may include: measuring the emission environment of the plurality of antennas in response to start of a service that requires a data transmission rate greater than or equal to a threshold value, or in response to a data error rate, less than or equal to a threshold value, during MIMO reception.

According to above-described various embodiments of the disclosure, the electronic device 101 may recognize the emission environment of antennas, without using an additional resource or power. From the perspective of the electronic device 101, the electronic device 101 may determine with high reliability an emission environment for each antenna by using a transmission signal, which has a high strength when being received.

According to above-mentioned various embodiments of the disclosure, resources available for data communication may be more secured by reducing unnecessary SRS transmission, and thus, throughput may be improved. Also, unnecessary power consumption by the electronic device 101 may be prevented and a battery duration time may be increased, by reducing unnecessary SRS transmission.

An electronic device according to various embodiments may be one of the various types of devices. The electronic device may include, for example, a portable communication device (e.g., a smart phone), a computer device, a portable multimedia device, a portable medical device, a camera, a wearable device, or home appliances. The electronic device according to an embodiment is not limited to the above-described devices.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    a plurality of antennas including a first antenna and a second antenna;
    a first front-end module (FEM);
    a second FEM;
    a radio frequency integrated circuit (RFIC) electrically connected to the first FEM and the second FEM;
    a switch module including at least one switch, the first FEM being selectively connected to the first antenna or the second antenna through the switch module, the second FEM being connected to the second antenna through the switch module; and
    at least one processor electrically connected to the RFIC and the switch module, and
    wherein the at least one processor is configured to:
        control the switch module to connect the first FEM with the first antenna and the second FEM with the second antenna,
        transmit a first signal through the first antenna,
        receive a second signal corresponding to the first signal transmitted by the first antenna through the second antenna, the second signal being transmitted from the second antenna to the RFIC through the switch module and the second FEM, and
        determine whether to transmit a sounding reference signal (SRS) to a base station (BS) using at least one antenna based on an emission environment, and
    wherein the emission environment is determined based on a strength of the second signal or a strength of a reflected signal of the first signal measured by the RFIC.

2. The electronic device of claim 1, wherein the switch module includes a first switch electrically connecting the first FEM with the first antenna or the second antenna and a second switch electrically connecting the second FEM with the second antenna.

3. The electronic device of claim 1, wherein the at least one processor is configured to transmit the SRS to the BS in case that the strength of the second signal is greater than a first threshold value.

4. The electronic device of claim 1, wherein the first signal transmitted through the first antenna is transmitted via a resource allocated for uplink communication with the BS.

5. The electronic device of claim 1, wherein the at least one processor is configured to change an antenna used for uplink communication with the base station in case that the strength of the reflected signal of the first signal is greater than a second threshold value.

6. The electronic device of claim 1, wherein the at least one processor is configured to transmit, to the base station, capability information related to a transmit antenna switching (TAS) operation which transmits the SRS by sequentially switching the plurality of antennas.

7. The electronic device of claim 6, wherein the capability information indicates at least one of whether to perform the TAS operation, or a number of antennas to be switched by the TAS operation.

8. The electronic device of claim 1, wherein the at least one processor is configured to measure an emission environment of the plurality of the antennas in response to start of a service that requires a data transmission rate greater than or equal to a threshold value, or in response to a data error rate, less than or equal to a threshold value, during multiple input multiple output (MIMO) reception.

9. The electronic device of claim 1, wherein the first FEM processes a transmission signal transmitted through the first antenna and a reception signal received through the at least one antenna.

10. An electronic device comprising:
    a plurality of antennas including a first antenna and a second antenna;
    a first front-end module (FEM) including a coupler;
    a second FEM;
    a radio frequency integrated circuit (RFIC) electrically connected to the first FEM and the second FEM;
    a switch module including a first switch and a second switch, the first FEM being selectively connected to the first antenna or the second antenna through the first switch and the second switch, the second FEM being connected to the second antenna through the second switch; and
    at least one processor electrically connected to the RFIC and the switch module,
    wherein the at least one processor is configured to:
        control the first switch to connect the first FEM with the first antenna and the second switch to connect the second FEM with the second antenna,
        transmit a first signal through the first antenna,
        receive a second signal corresponding to the first signal transmitted by the first antenna through the second antenna, the second signal being transmitted from the second antenna to the RFIC through the switch module and the second FEM,
        control the first FEM to detect a reflected signal of the first signal using the coupler, and
        determine whether to transmit a sounding reference signal (SRS) to a base station (BS) using at least one antenna based on an emission environment, and
    wherein the emission environment is determined based on a strength of the second signal or a strength of the detected reflected signal of the first signal measured by the RFIC.

11. The electronic device of claim 10, wherein the at least one processor is configured to control the first switch to connect the first FEM with the second switch and control the second switch to connect the second antenna with the first switch.

12. The electronic device of claim 10,
    wherein the first FEM processes a transmission signal transmitted through the first antenna and a reception signal received through the at least one antenna, and
    wherein the at least one processor is configured to transmit the SRS using the first FEM and the at least one antenna.

13. The electronic device of claim 10, wherein the second FEM processes a reception signal received through the second antenna.

14. The electronic device of claim 10, wherein the first signal transmitted through the first antenna is transmitted via a resource allocated for uplink communication with the BS.

15. The electronic device of claim 10, wherein the at least one processor is configured to change an antenna used for uplink communication with the base station in case that the strength of the detected reflected signal of the first signal is greater than a first threshold value.

16. The electronic device of claim 10, wherein the at least one processor is configured to transmit, to the base station, capability information related to a transmit antenna switching (TAS) operation which transmits the SRS by sequentially switching the plurality of antennas.

17. The electronic device of claim 16, wherein the capability information indicates at least one of whether to perform the TAS operation, or a number of antennas to be switched by the TAS operation.

18. The electronic device of claim 10, wherein the at least one processor is configured to measure an emission environment of the plurality of the antennas in response to start of a service that requires a data transmission rate greater than or equal to a threshold value, or in response to a data error rate, less than or equal to a threshold value, during multiple input multiple output (MIMO) reception.

* * * * *